United States Patent [19]
Håkansson

[11] Patent Number: 5,894,731
[45] Date of Patent: Apr. 20, 1999

[54] DEVICE FOR REGULATING THE ENGINE BRAKING POWER IN A TURBOCHARGED INTERNAL COMBUSTION ENGINE

[75] Inventor: Nils Olof Håkansson, Stenkullen, Sweden

[73] Assignee: AB Volvo, Gothenburg, Sweden

[21] Appl. No.: 08/714,093

[22] PCT Filed: Mar. 28, 1995

[86] PCT No.: PCT/SE95/00329

§ 371 Date: Sep. 17, 1996

§ 102(e) Date: Sep. 17, 1996

[87] PCT Pub. No.: WO95/26466

PCT Pub. Date: Oct. 5, 1995

[30] Foreign Application Priority Data

Mar. 29, 1994 [SE] Sweden ............... 9401059

[51] Int. Cl.[6] .................................................. F02B 37/12
[52] U.S. Cl. ........................................................... 60/602
[58] Field of Search ........................... 60/600, 601, 602, 60/603; 123/321, 322

[56] References Cited

U.S. PATENT DOCUMENTS

| | | |
|---|---|---|
| 4,961,145 | 10/1990 | Gernot . |
| 5,127,501 | 7/1992 | Arikawa . |
| 5,410,882 | 5/1995 | Davies et al. ............... 60/602 |
| 5,444,980 | 8/1995 | Dellora et al. ............... 60/602 |
| 5,647,318 | 7/1997 | Feucht et al. ............... 60/602 |

FOREIGN PATENT DOCUMENTS

| | | |
|---|---|---|
| 0 469 280 | 2/1992 | European Pat. Off. . |
| 0 607 655 | 7/1994 | European Pat. Off. . |
| 2 918 793 | 11/1980 | Germany . |
| WO 90/09514 | 8/1990 | WIPO . |

*Primary Examiner*—Michael Koczo
*Attorney, Agent, or Firm*—Young & Thompson

[57] ABSTRACT

Device for controlling the engine braking power of an internal combustion engine in a motor vehicle with a compression braking device and an exhaust pressure governor. The device includes a control unit which includes a microprocessor, to which there is fed relevant engine data and vehicle data for computing and continuously varying the degree of charging, so that the retardation of the vehicle during braking can be controlled towards a command value set by the driver.

8 Claims, 1 Drawing Sheet

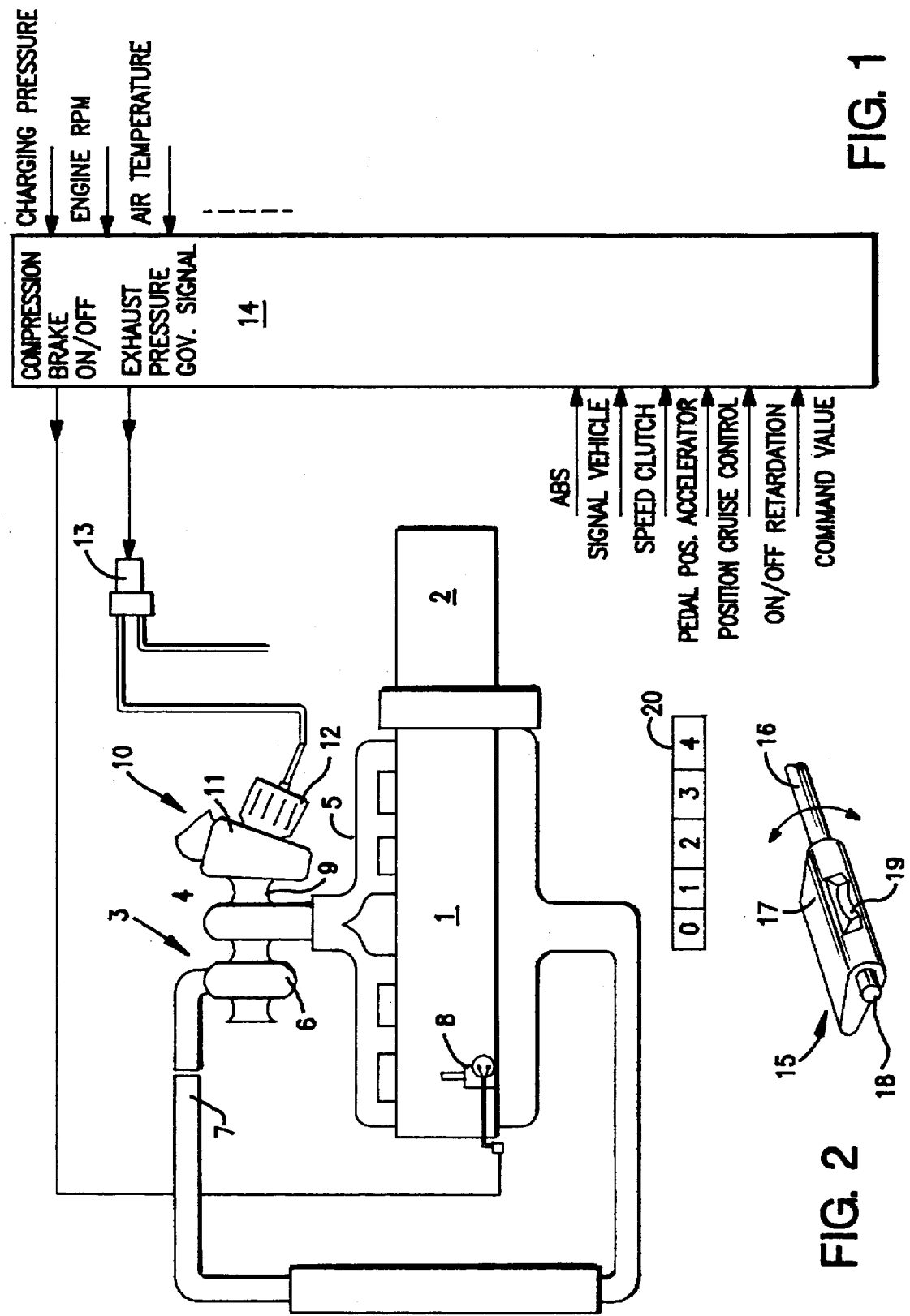

DEVICE FOR REGULATING THE ENGINE BRAKING POWER IN A TURBOCHARGED INTERNAL COMBUSTION ENGINE

BACKGROUND OF THE INVENTION

The present invention relates to a device for regulating the engine braking power of an internal combustion engine in a motor vehicle, which is equipped with a compression braking device, a device for varying the degree of charging during braking, and driver actuated means for activating the compression braking device and the device for varying the degree of charging.

DESCRIPTION OF THE RELATED ART

It is known that the engine braking power of a vehicle can be increased with the aid of a device of the above described type, by means of which the engine combustion chambers during braking are placed in communication, during the latter portion of the compression stroke, with the exhaust system, for example by opening the exhaust valves. The result will be that air compressed during the compression stroke will flow out from the cylinders, and thus compression work carried out during the compression stroke cannot be recovered during the expansion stroke, and therefore the braking power of the engine will be increased. An additional increase in the braking power can be achieved in a known manner by also placing the exhaust system in communication with the cylinder during the latter portion of the intake stroke, so that gases from the exhaust system can flow into the cylinders. This results in an increasing pressure in the cylinder and an inner charging, thus increasing the compression work after closing off the communication between the cylinders and the exhaust system. The degree of inner charging can be varied by means of an exhaust pressure governor (EP-governor), i.e. a damper in the exhaust duct, which can be controlled by the driver in a known manner between the completely open and completely closed positions.

Common to the hitherto known systems for increasing the braking power of the engine is that they all work without any feedback, i.e. when they are activated by the driver, for example by throwing a switch and releasing pressure on the accelerator, the engine will provide maximum braking power. In the example described above, this will involve, firstly, that the exhaust system is placed in communication with the cylinders during the latter portion of the intake stroke and/or compression stroke, and, secondly, closing the damper of the exhaust pressure governor. The engine will thus generate maximum braking power regardless of external conditions, such as road slope and the friction of the tires against the road surface. These external conditions sometimes cause the retardation to be greater than what is desired or cause the vehicle drive wheels to skid.

SUMMARY OF THE INVENTION

The purpose of the present invention is to achieve a device of the type described by way of introduction, which has a feedback regulating system, which primarily controls the retardation instead of the braking power to thereby eliminate the above mentioned disadvantages of the known devices.

This is achieved according to the invention by virtue of the fact that the driver actuated means are coupled to a control unit, to which the driver, via said means, can feed a command value for vehicle retardation and to which, via sensors connected to the same, engine data, such as degree of charge and rpm, and vehicle data, such as vehicle speed, accelerator position and clutch pedal position, are fed, and that the control unit is disposed to compare the set command value for the retardation with the actual value thereof and deliver a signal for setting the degree of charging as a function of said difference and of the accelerator position or the clutch pedal position.

In its simplest form the driver actuated means for setting the command value can have a single preset retardation level and be activated when the driver lifts his foot from the accelerator, so that the same retardation is always obtained regardless of external conditions. The retardation is in this case preset at a level which minimizes the risk of wheel skidding. In a preferred further development of the invention, the means for setting the command value provides a number of selectable retardation levels., so that tie driver can himself select the desired retardation level appropriate to the external conditions, for example a low level when the road surface is slippery and a high level when there is a sharp downhill slope and the road surface is dry with high friction against the vehicle tires. Such an arrangement can be integrated with advantage in a so-called cruise control, which automatically sets the throttle opening to the desired vehicle speed.

The device for varying the degree of charging can, as described above, be an exhaust pressure governor with a continuously variable damper for continuous variation of the inner charging or—in a turbocharged engine—a turbo unit with variable geometry or with variable setting of the waste gate.

BRIEF DESCRIPTION OF THE DRAWINGS

The invention is described below with reference to an example shown in the accompanying drawing, where FIG. 1 shows schematically a turbocharged diesel engine with a device according to the invention and FIG. 2 shows schematically a so-called cruise control with means for setting different retardation levels.

DESCRIPTION OF THE PREFERRED EMBODIMENTS

In FIG. 1, the number 1 designates a six-cylinder diesel engine with gearbox 2. A turbocompressor, generally designated 3, has its turbine portion 4 connected to the engine exhaust manifold 5 and its compressor portion 6 connected to the intake conduit 7 of the engine. The engine 1 has a schematically indicated compression braking device 8, which can be of the type which is shown and described in SE 466 320, and by means of which the engine cylinders, during the latter portion of the intake stroke, and/or during the latter portion of the compression stroke, can be placed in communication with the engine exhaust manifold to increase the engine braking power. For a more detailed description of the design and functioning of a conceivable embodiment of the compression braking device 8, reference is thus made to SE 466 320.

The outlet 9 of the turbine 4 is connected to an exhaust pressure governor, generally designated 10, which can be of a type known per se, comprising a damper housing 11 containing a damper (not shown) and a pneumatic control means 12, which is in communication, via a control valve 13, with a source of compressed air, e.g. the pressure tank of the vehicle brake system. With the aid of the control means 12, the damper can be set continuously variably between the completely open position and the completely closed position.

A control unit 14, which is preferably a microprocessor, provides output signals for turning the compression braking device on or off and for setting the exhaust pressure governor 10 damper as a function of various engine and vehicle data fed into the control unit from sensors which are known per se and are not shown in more detail here.

As is indicated in FIG. 1, signals are fed to the control unit 14 representing charge pressure (degree of charging), engine rpm and air temperature, i.e. engine data, and signals representing ABS on/off, vehicle speed, clutch pedal position, accelerator position, cruise control on/off and retardation level, i.e. vehicle data.

FIG. 2 shows schematically a cruise control 15 comprising an arm 16 mounted on the vehicle steering wheel column with a handle 17, with known operating buttons 18,19 for activating or deactivating the automatic throttle control for maintaining constant vehicle speed. By means of the handle 17, which in the embodiment shown is rotatable, the desired retardation level is set by turning the handgrip in one direction from a zero position. The levels are shown in a window 20 on the vehicle instrument panel. In the embodiment shown, there are five levels from zero to a maximum retardation level four.

The device according to the invention functions as follows:

The driver sets with a handle 17 the retardation at a certain level, e.g. four, and activates the cruise control, so that a signal representing the selected retardation is fed to the control unit 14, which compares the set command value of the retardation with the actual retardation value computed via the actual vehicle speed value. When the driver lets up on the accelerator, provided the clutch pedal is not depressed, the control unit 14, depending on the difference between the actual value and the command value, will actuate the control means 12 via the valve 13 to set the exhaust pressure governor 10 at a suitable degree of charging. This means that the greater the difference is between the command value and the actual value for retardation, the greater will be the degree of charging when the compression brake 8 is activated. Should the selected retardation level be too high with regard to the road surface, so that the drive wheels start to skid, the ABS on-signal will prompt the control unit to reduce the engine braking power by turning off the compression brake 8, and automatically selecting a lower retardation level or, as an alternative, providing the driver with the possibility of selecting a lower retardation level. The compression brake 8 is also turned off, if the driver should depress the clutch pedal. This is important to prevent killing the engine, which would result in loss of power steering and power brakes.

The invention provides a device, by means of which it is possible to control, by automatically varying the degree of charging relative to the braking requirements in an engine with a compression braking device, the actual value of the retardation to a desired command value, so that very small variations in the vehicle retardation occur during engine braking. Instead of, or possibly together with the exhaust pressure governor, a turbo unit with variable geometry or variable control of the turbocompressor waste gate, can be used to vary the degree of charging of the engine.

I claim:

1. Device for regulating the engine braking power of an internal combustion engine in a motor vehicle equipped with a compression braking device, comprising: a device for varying the degree of charging during braking, a driver actuated means for activating the compression braking device and said device for varying the degree of charging, said driver actuated means (15) being coupled to a control unit (14), to which the driver, via said driver actuated means, can feed a command value for vehicle retardation and to which, via sensors connected to the same, engine data and vehicle data are fed, and said control unit being disposed to compare the set command value for the retardation with the actual value thereof and deliver a signal for setting the degree of charging as a function of said difference and one of the accelerator position and the clutch pedal position.

2. Device according to claim 1, wherein said driver actuated means for actuating the compression braking device further comprises a device for selecting the degree of charging integrated in a cruise control device (15).

3. Device according to claim 2, wherein said cruise control device (15) can be set to provide a signal to said control unit (14), representing a retardation level which is one of a plurality of driver selectable levels.

4. Device according to claim 1, wherein said device for varying the degree of charging is an exhaust pressure governor (10) with a damper with infinitely variable settings.

5. Device according to claim 1, wherein said device for varying the degree of charging is a turbo unit (3) of variable geometry.

6. Device according to claim 1, wherein said device for varying the degree of charging is a turbo unit (3) with a waste gate, which can be set for various charge pressure levels.

7. Device according to claim 1, wherein said control unit (14) is a microprocessor.

8. Device according to claim 1 adapted for use in a vehicle with ABS-brakes, wherein said control unit (14) is disposed, when the ABS-brakes are actuated, to send a signal to turn off the compression braking device (8).

* * * * *